(12) United States Patent
Goodzeit et al.

(10) Patent No.: US 9,170,105 B1
(45) Date of Patent: Oct. 27, 2015

(54) SYSTEM AND METHOD FOR IMPROVED ACCURACY GYRO RATE SENSING

(75) Inventors: Neil E. Goodzeit, Princeton, NJ (US); Harald J. Weigl, Doylestown, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 500 days.

(21) Appl. No.: 13/155,337

(22) Filed: Jun. 7, 2011

Related U.S. Application Data

(60) Provisional application No. 61/426,999, filed on Dec. 23, 2010.

(51) Int. Cl.
*G01C 19/00* (2013.01)
*G01C 17/02* (2006.01)

(52) U.S. Cl.
CPC ..................................... *G01C 17/02* (2013.01)

(58) Field of Classification Search
USPC ........................................................ 702/150
See application file for complete search history.

(56) References Cited

U.S. PATENT DOCUMENTS 6,732,977 B1   5/2004   Goodzeit et al.
7,835,826 B1   11/2010  Weigl et al.

OTHER PUBLICATIONS

Sherryl H. Stovall, Basic Inertial Navigation, Sep. 1997, Approved for public release; distribution is unlimited. Naval Air Warfare Center Weapons Division China Lake, California 93555-6100, pp. 1-34.*
What is MEMS Technology, 4 pages, printed Oct. 28, 2013.*
MasteringElectronicsDesign.com_The Differential Amplifier Common-Mode Error, 6 pages, printer Oct. 28, 2013.*
Glossary Definition for Common-Mode-Signals, 1 page, printed Oct. 28, 2013.*
Techopedia on MEMS, p. 1, printed Oct. 24, 2014, http://www.techopedia.com/definition/24744/micro-electromechanical-system-mems[Oct. 29, 2014 7:27:26 AM].*
Merriam-Webster definition Tiny, http://www.merriam-webster.com/dictionary/tiny[Oct. 29, 2014 7:29:56 AM], 1 page.*
IXZ-500 Dual-Axis Gyro Product Specification, 2009, Inven Sense, Inc., p. 1-26.*
X. Li, et al., "Observability of a Geosynchronous Spacecraft Attitude Determination System," Journal of Guideance, Control, and Dynamics, Nov.-Dec. 2003, pp. 972-978, vol. 26, No. 6.

* cited by examiner

*Primary Examiner* — Tung S Lau
(74) *Attorney, Agent, or Firm* — McDermott Will & Emery LLP

(57) ABSTRACT

The present invention addresses performance limitation of gyros (e.g., MEMS gyros) by significantly reducing common-mode noise and bias effects. In one embodiment, an array of gyros, which may comprise four or more gyros, is configured so that common-mode error effects can be separated from the sensed rotational motion of the gyros and therefore removed. Removing the common-mode effects increases attitude estimation and spacecraft pointing accuracy, particularly during periods when the gyros must solely provide the attitude reference.

20 Claims, 12 Drawing Sheets

SYSTEM AND METHOD FOR IMPROVED ACCURACY GYRO RATE SENSING

CROSS-REFERENCE TO RELATED APPLICATION

The present application claims the benefit of priority under 35 U.S.C. §119 from U.S. Provisional Patent Application Ser. No. 61/426,999 entitled "IMPROVED ACCURACY OF MEMS GYRO RATE SENSING," filed on Dec. 23, 2010, which is hereby incorporated by reference in its entirety for all purposes.

STATEMENT REGARDING FEDERALLY SPONSORED RESEARCH OR DEVELOPMENT

Not applicable.

FIELD

The present invention generally relates to gyros, and more particularly to a system and method for improved accuracy gyro rate sensing.

BACKGROUND

Next-generation spacecraft will use star trackers and Micro Electro-Mechanical System (MEMS) gyros for attitude determination and control. MEMS gyros are solid-state devices that are used widely in consumer products and are now being adapted for space applications. They are manufactured in large quantities using processes from the semi-conductor industry, are very small, low power, light weight, and inherently low cost. Using MEMS gyros and star trackers can eliminate the need for a high performance Inertial Measurement Unit (IMU) that can be costly and heavy (e.g., $3 million and 45 lbs). The disadvantage of MEMS gyros is that they have much lower accuracy than traditional gyro technologies (e.g., 100 times or greater performance reduction). MEMS gyros may exhibit bias and noise from both uncorrelated and common-mode sources. Common-mode errors may be introduced by fluctuations in power supply voltages, electronics noise or interference between gyro channels. The common-mode errors reduce sensing accuracy thereby limiting the range of applications and the pointing accuracy that can be achieved using MEMS gyros.

SUMMARY OF THE INVENTION

The present invention addresses performance limitation of gyros (e.g., MEMS gyros) by significantly reducing common-mode noise and bias effects. In one embodiment, an array of gyros, which may comprise four or more gyros, is configured so that common-mode error effects can be separated from the sensed rotational motion of the gyros and therefore removed. Removing the common-mode error effects increases attitude estimation and spacecraft pointing accuracy, particularly during periods when the gyros must solely provide the attitude reference.

In one aspect of the disclosure, an attitude determination system is provided. The attitude determination system comprises a plurality of gyros and a processor. The processor is configured to transform gyro rates from the gyros into body rates using a common-mode transformation, to correct the body rates for gyro biases, and to generate an attitude based on the corrected body rates. The common-mode transformation separates common-mode error associated with the gyros from the body rates.

In another aspect of the disclosure, a method for determining attitude is provided. The method comprises transforming gyro rates from a plurality of gyros into body rates using a common-mode transformation, wherein the common-mode transformation separates common-mode error associated with the gyros from the body rates. The method further comprises correcting the body rates for gyro biases, and generating an attitude based on the corrected body rates.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

DETAILED DESCRIPTION

The present invention addresses performance limitation of gyros (e.g., MEMS gyros) by significantly reducing common-mode noise and bias effects. In one embodiment, an array of MEMS gyros, which may comprise four or more gyros, is configured so that common-mode error effects can be separated from the sensed rotational motion of the gyros and therefore removed. Removing the common-mode error effects increases attitude estimation and spacecraft pointing accuracy, particularly during periods when the MEMS gyros must solely provide the attitude reference. Further, removing the common-mode error effects avoid the need for precision power supplies and electronics to reduce common-mode error, which can be complex and expensive. Additionally, by combining the outputs of many gyros, the arrangement provides averaging that reduces uncorrelated error effects. A further benefit of the present invention is that common-mode error rejection may be maintained should one or more of the gyros fail.

Embodiments of the present invention are described below using the example of MEMS gyros and a star tracker. However, it is to be understood that the present invention is not limited to this example, and that other types of gyros and attitude sensors may be used with the present invention.

Figure 1:
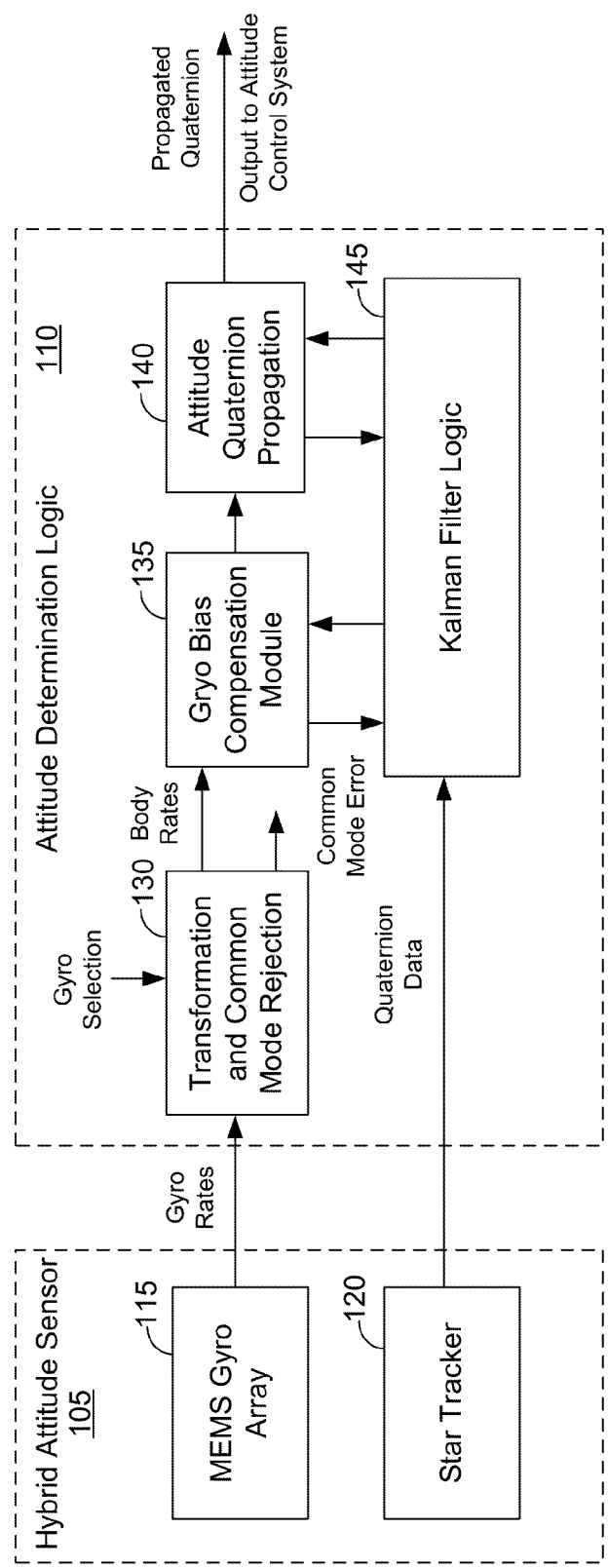
FIG. 1 is a conceptual diagram showing a system for improved accuracy gyro rate sensing according to an embodiment of the present invention.

FIG. 1 shows a block diagram of a system according to an embodiment of the invention. The system includes attitude sensors 105 and Attitude Determination (AD) logic 110, which may be implemented in the sensors and/or spacecraft flight software executed by an onboard computer. As shown in FIG. 1, the attitude sensors 105 may be hybrid sensors that combine a star tracker 120 with MEMS gyros 115 in a single unit. Alternatively, the MEMS gyros 115 may be packaged separately in a standalone unit, where the standalone unit may receive inputs from star tracker heads and perform processing of the star tracker and MEMS gyro data. Four or more MEMS gyros are housed within an assembly that allows the gyro sensing axes to be oriented at specific angles relative to the hybrid sensor reference axes. Exemplary orientations for six MEMS gyros are provided below with reference to FIG. 2. In general, the invention may work with any geometrical arrangement of four or more MEMS gyros, as long as a mathematical condition involving the gyro sensing axis unit vectors is satisfied. As will be shown later, satisfying this condition ensures that the common-mode error effects can be separated from the actual physical motion of the gyros.

The AD logic 110 includes a transformation and common mode rejection module 130, a gyro bias compensation module 135, an attitude quaternion propagation module 140, and Kalman filter logic 145. The inputs to the AD logic 110 include quaternion data from the star tracker 120 and gyro rate data from the MEMS gyros 115. The quaternion data provides a mathematical representation of the spacecraft's attitude, as measured by the star tracker 120. The gyro rate data from each MEMS gyro provides the angular rate relative to the respective gyro axis. The AD logic 110 determines the spacecraft inertial attitude based on the gyro rate data from the MEMS gyros 115 and the qauntemion data from the star tracker 120.

The transformation and common mode rejection module 130 transforms the gyro rates from the gyro frame to the spacecraft body coordinate frame using a common-mode transformation, which is discussed in greater detail below. The common-mode transformation is performed based on which gyros are selected for use, and in such a way that the common-mode error is removed. In a preferred embodiment, a matrix of dimension 4×N is used to perform the common-mode transformation, where N is the number of gyros selected (N≥4). The result of this transformation includes an estimate of the common-mode error, which may be used for performance monitoring.

The gyro bias compensation module 135 corrects the body rates for gyro biases (e.g., fixed/random bias error) using bias estimates from the Kalman filter logic 145. The corrected body rates are then inputted to the quatemion propagation module 140, which generates a propagated quatemion based on the corrected body rates and an attitude estimate from the Kalman filter logic 145, and outputs the propagated quatemion to the attitude control system of the spacecraft. The use of a Kalman filter to estimate spacecraft attitude and the fixed/random gyro biases is known in the art, and described, for example, in "Observability of a Goesynchronous Spacecraft Attitude Determination System," X. Li and N Goodzeit, Journal of Guidance, Navigation, Control and Dynamics, Vol. 26, Number 6, 2003, which is incorporated herein by reference in its entity. Because the gyro bias estimation by the Kalman filter logic 145 does not have to capture common-mode effects, accuracy is improved. Also, attitude propagation accuracy is improved because common-mode noise is absent.

Figure 2:
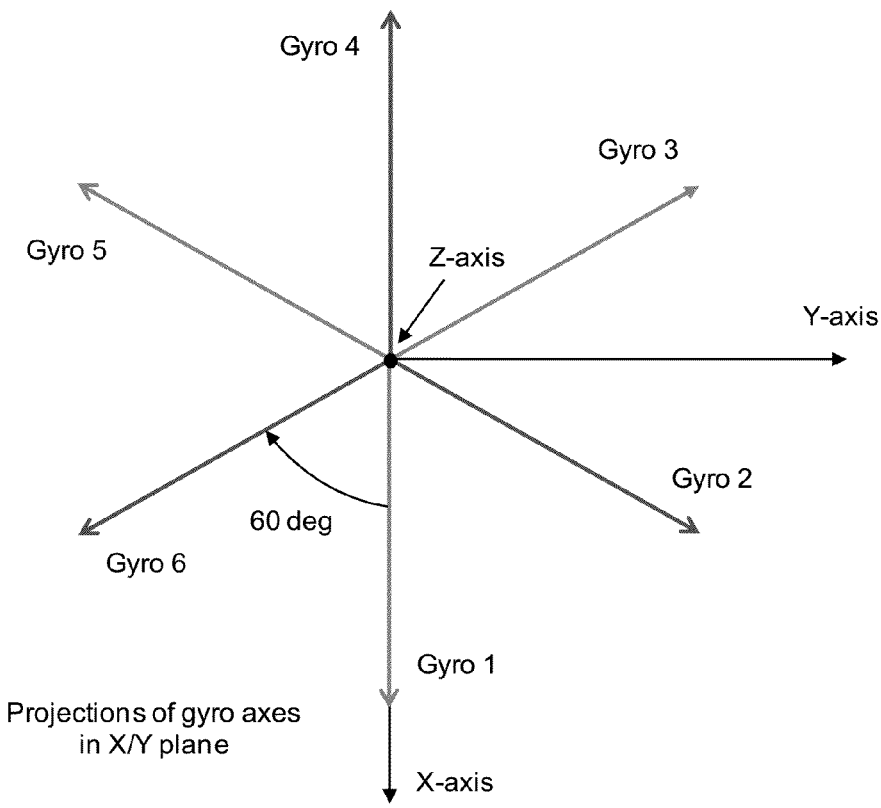
FIG. 2 shows an arrangement of gyros according to an embodiment of the present invention.

As shown in FIG. 2, the MEMS gyro axes are defined relative to a reference coordinate system that includes a longitudinal axis (Z axis) and a transverse plane (X/Y plane). The X, Y, and Z axes form a right-handed triad. The Z axis is perpendicular to the drawing in FIG. 2. According to a preferred embodiment, the gyros axes are uniformly spaced when their axes are projected into the transverse plane (X/Y plane). For example, if there are N gyros, then the angle separating the projected gyro axes is 360/N deg. For a system of six MEMS gyros the separation angle is 60 deg. Additionally, each gyro is canted from the longitudinal axis by a specified angle. For the preferred embodiment with six gyros, three of the gyros are canted about 54.7 deg from the positive longitudinal axis (+Z axis) and the other three are canted by the same angle but from the negative longitudinal axis (−Z axis). The arrangement actually comprises two orthogonal triads with back-to-back gyro pairs. One of ordinary skill in the art will recognize that the arrangement can be expressed in other reference frames without changing the geometric relationship between the gyro axes. Furthermore, the gyros may be distributed in the transverse plane in a non-uniform manner and different cant angles may be used for each gyro. Also, exact gyro axis alignment is unnecessary as the effects of known alignment variations are accounted for in the processing of the gyro measurements.

Figure 3:
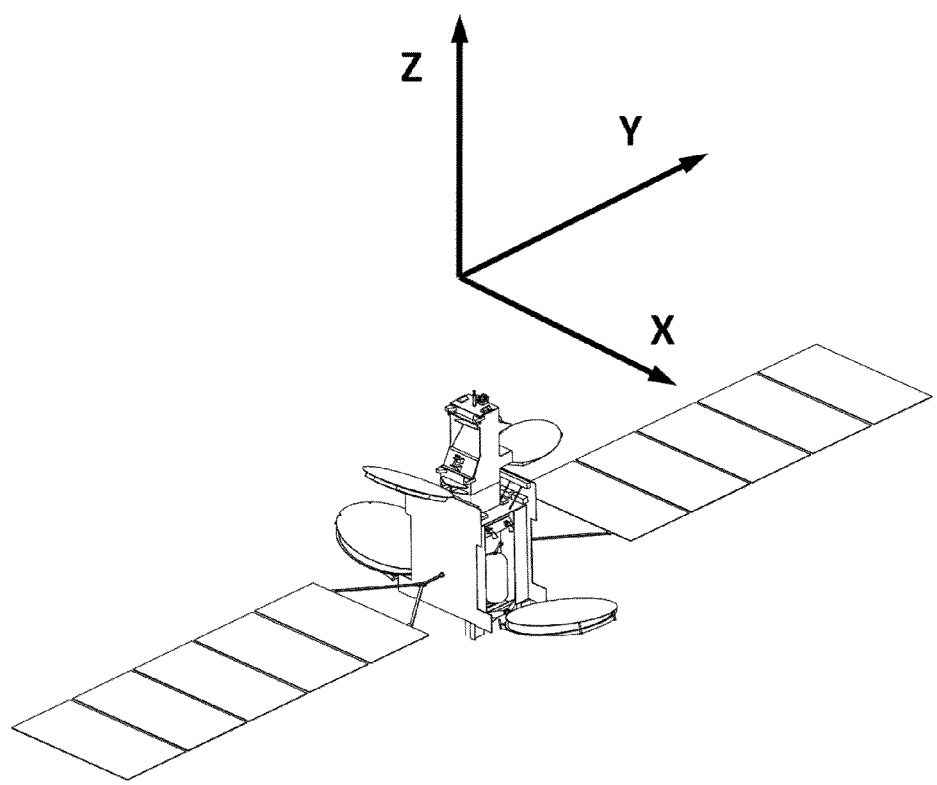
FIG. 3 shows an example of a spacecraft body coordinate frame.

FIG. 3 illustrates the spacecraft body coordinate frame definition used in this disclosure. The roll axis (X) is normal to the east face of the spacecraft. The pitch (Y) axis is parallel to the south solar array rotation axis. The yaw (Z) axis is normal to the earth-facing spacecraft panel and completes the right-handed triad. In general, the gyro axes in FIG. 2 are not aligned with the spacecraft body axes in FIG. 3. The present invention improves the accuracy of the estimated orientation of the body coordinate axes relative to a reference frame based on measurements from a set of MEMS gyros that may be susceptible to common-mode errors.

The angular rate measured by a gyro can be calculated as the dot product of the three-axis spacecraft body rate vector, $\omega_b(t)$, and the gyro sensing axis, v, where v is a unit vector denoting the orientation of the gyro sensing axis in the spacecraft body frame. This relationship may be expressed in matrix form for a set of N gyros by the following:

$$\omega_g(t) = V_g \omega_b(t) \qquad (1)$$

where $\omega_g(t)$ is a gyro rate vector having dimension N×1, and $V_g$ is a body-to-gyro transformation matrix having dimension N×3. Equation 1 may be expanded into matrix form as follows:

$$\begin{bmatrix} \omega_1(t) \\ \omega_2(t) \\ \vdots \\ \omega_N(t) \end{bmatrix} = \begin{bmatrix} v_1(t) \\ v_2(t) \\ \vdots \\ v_N(t) \end{bmatrix} \omega_b(t) = \begin{bmatrix} v_{x1} & v_{y1} & v_{z1} \\ v_{x2} & v_{y2} & v_{z2} \\ & \vdots & \\ v_{xN} & v_{yN} & v_{zN} \end{bmatrix} \begin{bmatrix} \omega_x(t) \\ \omega_y(t) \\ \omega_z(t) \end{bmatrix} \qquad (2)$$

As shown in Equation 2, the body-to-gyro transformation matrix, $V_g$, is comprised of the components of the N gyro sensing axis vectors.

For spacecraft attitude determination, the three-axis spacecraft angular velocity must be computed from a set of gyro measurements. Prior art systems perform this calculation by inverting Equation 1. A minimum of three gyros is required to compute the three-axis body rate components. In addition, the gyros must be oriented so that the rank of the transformation matrix, $V_g$, is 3 in order to ensure that all body-axis components may be uniquely determined. With three gyros, the body rate vector, $\omega_b(t)$, is computed using the inverse of the body-to-gyro transformation matrix and the gyro rate, $\omega_g(t)$, as follows:

$$\omega_b(t) = V_g^{-1} \omega_g(t) \tag{3}$$

The use of more than three gyros provides averaging that attenuates uncorrelated gyro noise as is known in the art. Typical prior art systems with more than three gyros compute the body rate based on a least-squares estimate using the pseudo-inverse of the transformation matrix, $V_g$, as follows:

$$\omega_b(t) = (V_g^T V_g)^{-1} V_g^T \omega_g(t) \tag{4}$$

where $V_g^T$ is the transpose of the transformation matrix. However, the body rate vector, $\omega_b(t)$, computed by prior art systems includes common-mode errors. Prior art systems do not explicitly separate and reject common-mode errors, which may have a significant impact on the overall accuracy of MEMS gyro-based attitude determination.

Embodiments of the present invention are able to separate out common-mode errors from the body rate vector, $\omega_b(t)$, and therefore reject the common-mode errors for improved attitude determination. In addition, embodiments of the present invention define gyro configurations that allows rejection of common-mode errors. This allows systems to take advantage of the ability to use multiple MEMS gyros with minimal cost, power and weight penalties.

In one embodiment, Equations 1 and 2 are expanded to account for the contribution of a scalar, common-mode error, $e(t)$, to the gyro rate measurements as follows:

$$\omega_g(t) = V_g \omega_b(t) + c e(t) \tag{5}$$

$$\begin{bmatrix} \omega_1(t) \\ \omega_2(t) \\ \vdots \\ \omega_N(t) \end{bmatrix} = W \begin{bmatrix} \omega_b(t) \\ e(t) \end{bmatrix} = \begin{bmatrix} v_1(t) \\ v_2(t) \\ \vdots \\ v_N(t) \end{bmatrix} c \tag{6}$$

$$\begin{bmatrix} \omega_b(t) \\ e(t) \end{bmatrix} = \begin{bmatrix} v_{x1} & v_{y1} & v_{z1} & c_1 \\ v_{x2} & v_{y2} & v_{z2} & c_2 \\ & & \vdots & \\ v_{xN} & v_{yN} & v_{zN} & c_N \end{bmatrix} \begin{bmatrix} \omega_x(t) \\ \omega_y(t) \\ \omega_z(t) \\ e(t) \end{bmatrix}$$

where c is a common-mode error weighting vector for N gryos. The present invention does not rely on gyro orientation symmetry to reject common-mode errors, and MEMS gyros do not have to be precisely aligned to their specified nominal angles. These aspects of the invention provide the potential of simplifying the unit design and reduce cost. For one aspect of the invention, pre-operational measurements of the gyro axis vectors may be used to form the W matrix in Equation 6. This improves performance by accounting for known differences in the actual versus specified gyro alignment. The common-mode error, $e(t)$, may impact all gyros equally for some MEMS gyro systems. In this case, all N elements in the common-mode error weighting vector, c, will be equal to one. Non-uniform weighting may be used for systems where the common-mode error contribution varies from gyro to gyro. The values of the weighting vector components may be determined along with the gyro alignments during pre-operational calibration.

The present invention requires that the gyros be oriented such that the W matrix (with dimension N×4) has a rank of 4. This condition ensures that the common-mode error, $e(t)$, can be separated from the actual gyro-sensed rotational motion through the pseudo-inverse of the W matrix. Using the pseudo-inverse of the W matrix, the body rate vector, $\omega_b(t)$, may be computed as follows:

$$\begin{bmatrix} \omega_b(t) \\ e(t) \end{bmatrix} = \begin{bmatrix} \omega_x(t) \\ \omega_y(t) \\ \omega_z(t) \\ e(t) \end{bmatrix} = M \omega_g(t) = (W^T W)^{-1} W^T \omega_g(t) \tag{7}$$

where M is the pseudo-inverse matrix having dimension 4×N. Unlike the body rate estimates in Equations 3 and 4, the common-mode error contributions are explicitly removed from the estimated body rate components using the common-mode transformation in Equation 7. This improves attitude determination (AD) accuracy since the Kalman filter logic 145 in FIG. 1 does not have to track common-mode errors, which may not be accurately captured by the filter state-space error model. As demonstrated by the simulations discussed below, removing the common-mode error from the estimated body rate significantly improves attitude determination accuracy during periods when no star tracker data is available (e.g., while the Sun is in the tracker field of view). In one aspect of the invention, only the first three rows of Equation 7 are used to solve for the improved accuracy body-rate estimate. Alternatively, the common-mode error, $e(t)$, in the fourth row may also be computed and monitored over time to assess the health and performance of the sensor unit.

Simulation results will now be discussed illustrating how various embodiments of the present invention allow the AD system to accurately separate common-mode errors from a set of MEMS gyro rate measurements. The simulation models performance during geosynchronous transfer orbit operations when the Sun may periodically pass through the star tracker field of view. In the simulation, the spacecraft rotates about the yaw (Z) axis with a 10 minute rotation period (0.6°/sec). A temperature sensitive common-mode bias error is modeled and applied to all selected gyros. This simulates the impact of temperature sensitive electronics, such as a power supply, as the sensor unit passes in and out of the Sun during each rotation. For all simulations, star tracker data is used to update the attitude and gyro bias estimates during the first 180 minutes. After 180 minutes, two spacecraft yaw rotations without tracker data are simulated to illustrate the improved attitude estimation accuracy using embodiments of the present invention. For the simulated operational scenario with 6 gyros, embodiments of the invention improve the accuracy of open-loop attitude propagation without star tracker data by more than a factor of 10 on the roll and pitch axes.

Figure 4:
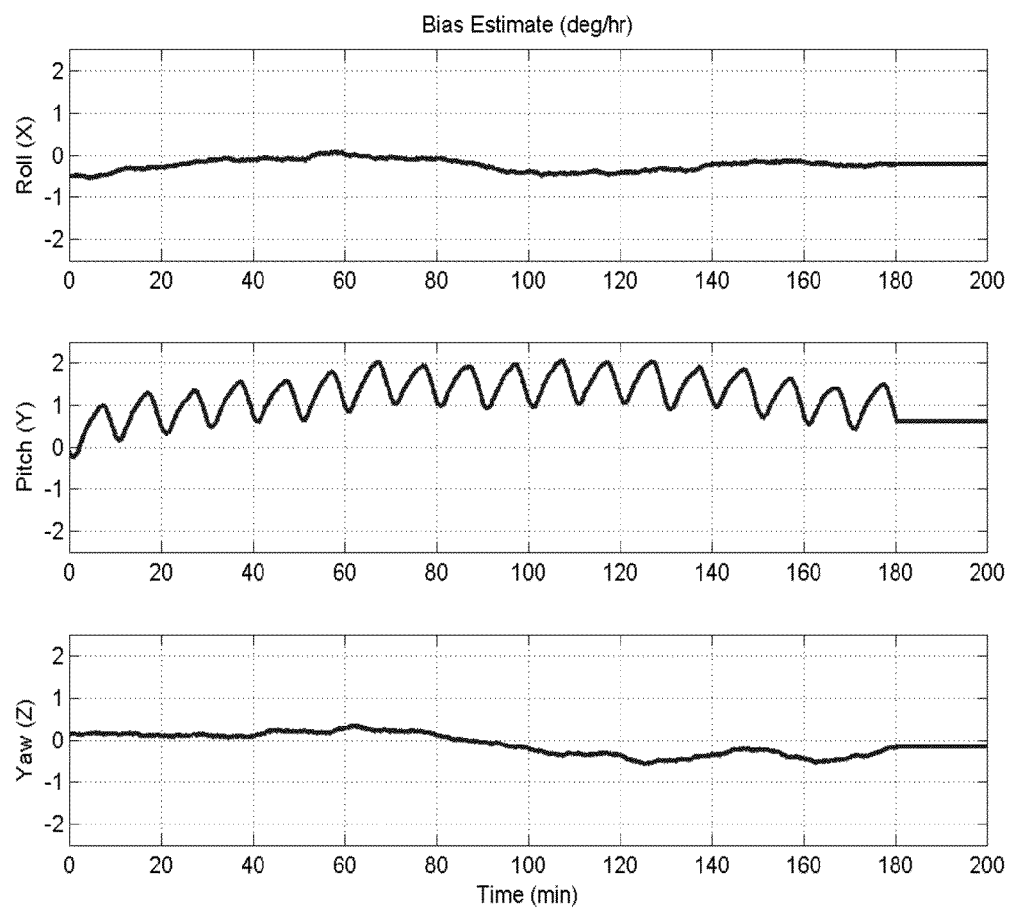
FIG. 4 is a plot showing gyro bias estimates for a prior art system.
Figure 5:
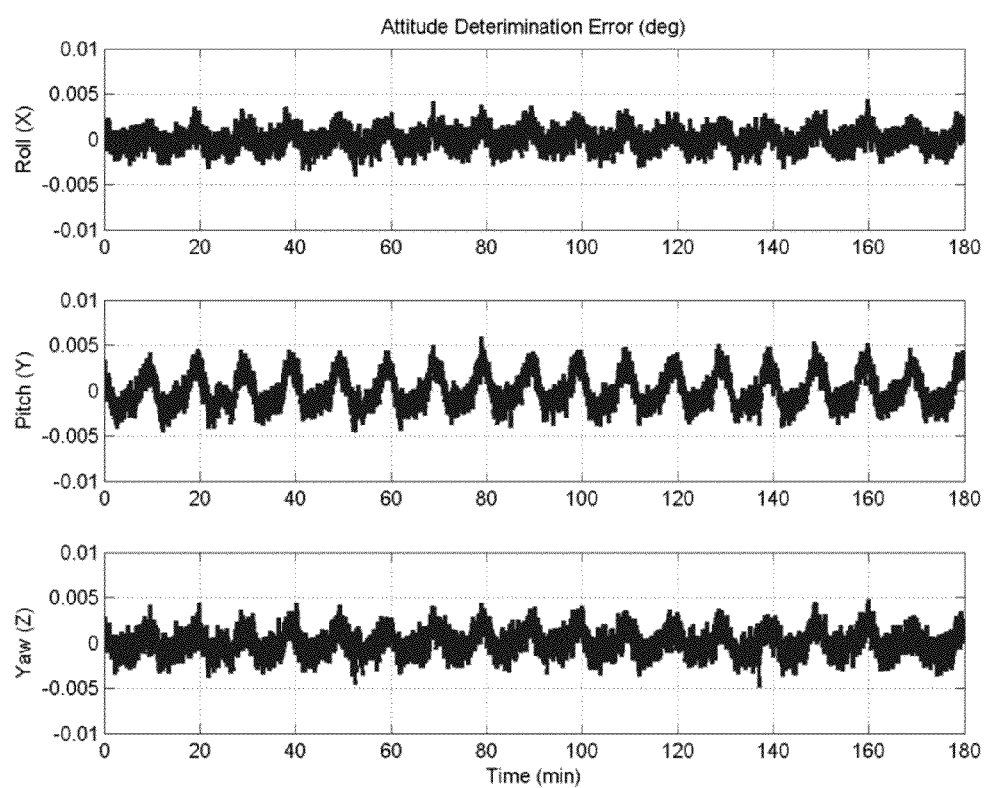
FIG. 5 is a plot showing attitude estimation error with star tracker data for the prior art system.
Figure 6:
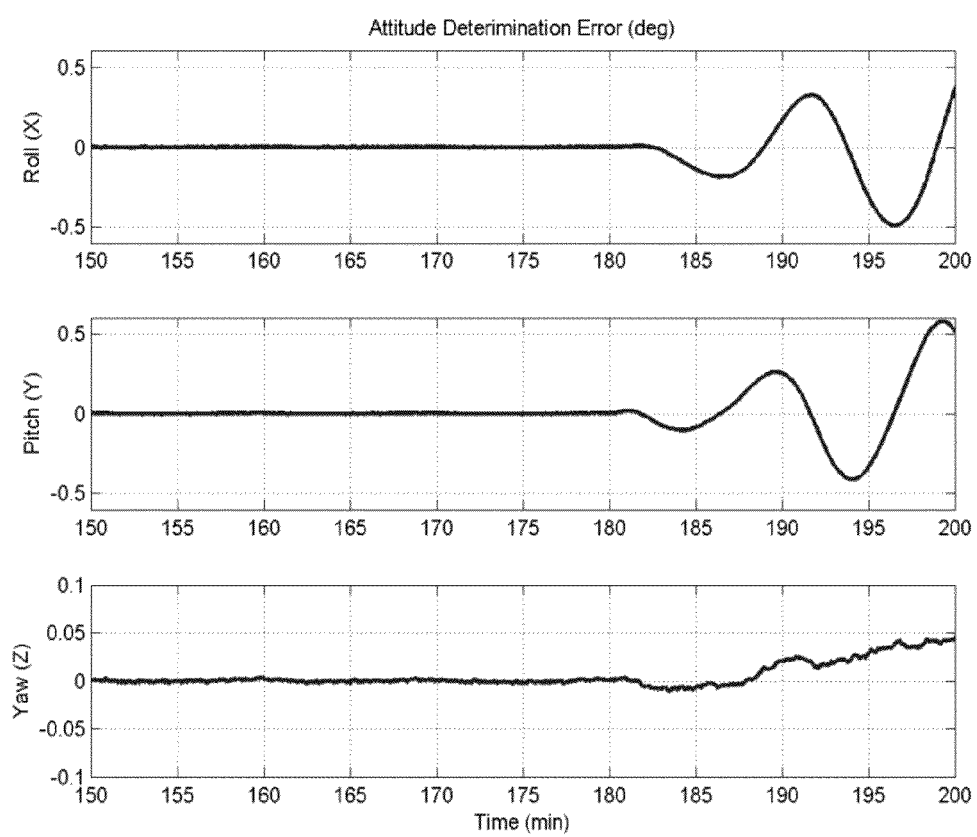
FIG. 6 is a plot showing attitude estimation error without star tracker data for the prior art system.

FIGS. 4 to 6 show results for a prior art AD system performance. In this case, four MEMS gyros are modeled in a standard pyramid configuration. The four gyros are canted 54.7 deg from the positive spacecraft pitch axis (Y) in FIG. 3, and the gyro axes project into the roll/yaw (X/Z) plane 45 deg from the roll/yaw axes. The corresponding prior art body-to-gyro transformation matrix is shown in Equation 8 below:

$$V_{g\_PRIOR\_ART} = \begin{bmatrix} 0.58 & 0.58 & 0.58 \\ 0.58 & 0.58 & -0.58 \\ -0.58 & 0.58 & -0.58 \\ -0.58 & 0.58 & 0.58 \end{bmatrix} \quad (8)$$

Since all four gyro axes project along the positive pitch axis, this prior art gyro configuration cannot be used for common-mode error rejection. This is confirmed since this configuration does not satisfy the mathematical condition required for common-mode error rejection. For example, adding a fourth column of ones to the transformation matrix in Equation 8 results in a 4×4 matrix of rank 3 (instead of rank 4). This prior art gyro configuration amplifies a common-mode error by a factor of 1.7 along the pitch axis. This is illustrated by the Kalman filter gyro bias estimates shown in FIG. 4. The filter attempts to track the pitch axis common-mode gyro bias while star tracker data is available. FIG. 4 shows that the estimated gyro bias is held constant when tracker updates stop after 180 minutes. As shown in FIG. 5, although the common-mode effect is evident, the attitude determination errors remains small when star tracker data is available. FIG. 6 shows how the attitude determination error grows after 180 minutes when star tracker data is unavailable and the attitude is propagated open-loop using the MEMS gyro data. The yaw error grows to about 0.05 deg, and the roll and pitch errors grow to 0.6 deg within two spacecraft revolutions. This is due to the corrupted pitch axis gyro bias estimate. For this scenario, yaw pointing is not critical, but the roll and pitch errors are significant because they impact the pointing of the orbit transfer thrusters.

Equation 9 below shows the W matrix in Equation 6 for an example of 6 MEMS gyros according to an embodiment of the present invention:

$$W = \begin{bmatrix} 0.58 & 0.58 & 0.58 & 1.0 \\ 0.79 & -0.58 & -.021 & 1.0 \\ 0.21 & 0.58 & -0.79 & 1.0 \\ -0.58 & -0.58 & -.058 & 1.0 \\ -0.79 & 0.58 & 0.21 & 1.0 \\ -0.21 & -0.58 & 0.79 & 1.0 \end{bmatrix} \quad (9)$$

In this embodiment, 6 gyro cant angles alternate between 54.7 deg from the positive and negative pitch (Y) axes. The projection of the first gyro axis into the roll/yaw plane is rotated by 45 deg from the roll (X) axis toward the yaw (Z) axis. The projections of the remaining gyros are evenly spaced by 60 deg within the roll/yaw plane. A value of one is assumed for all 6 elements of the common-mode weighting vector. As required by the invention, the W matrix in Equation 9 has a rank of 4.

Figure 7:
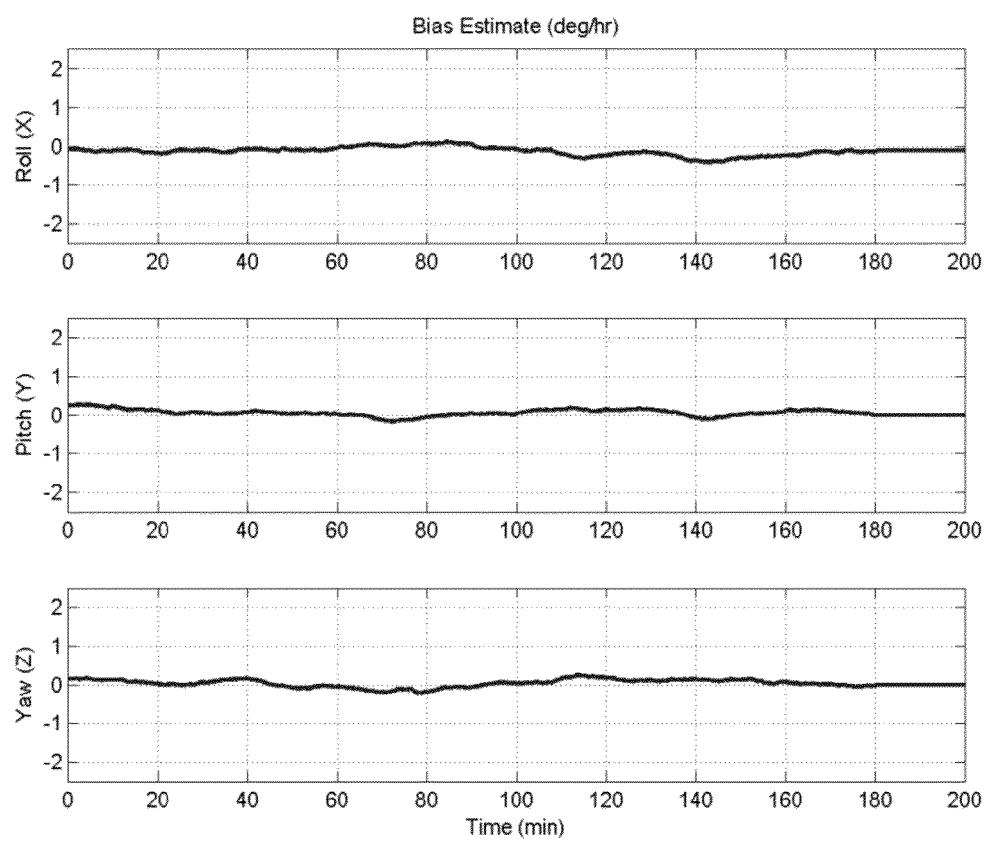
FIG. 7 is a plot showing improved gyro bias estimates with 6 gyros according to an embodiment of the present invention.
Figure 8:
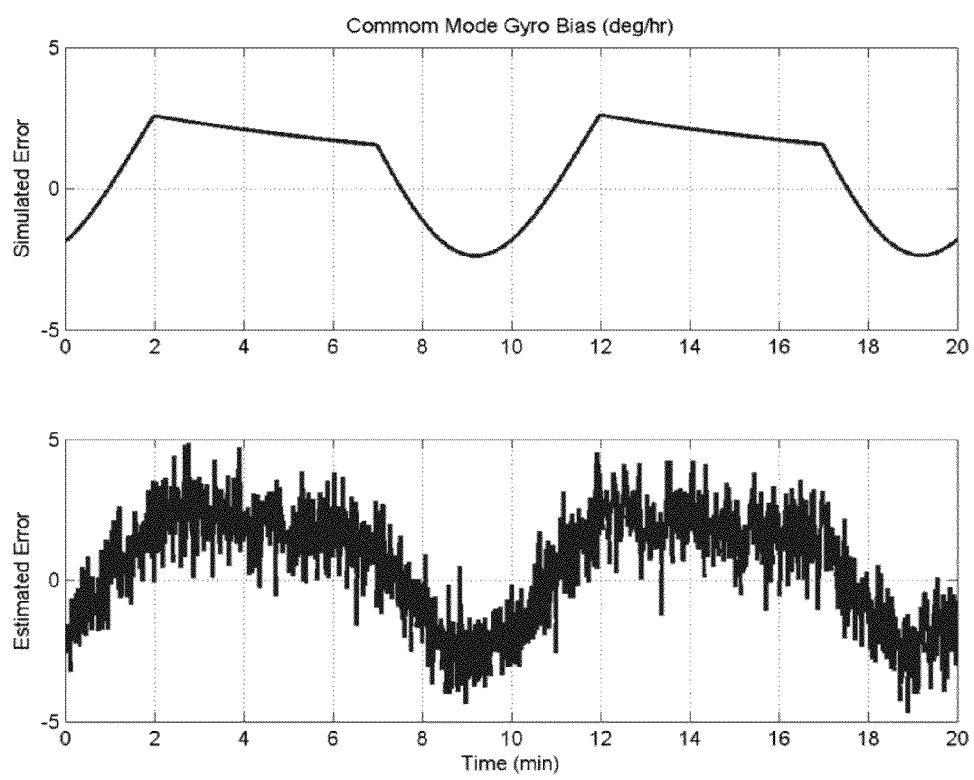
FIG. 8 is a plot showing common-mode bias estimates with 6 gyros according to an embodiment of the present invention.
Figure 9:
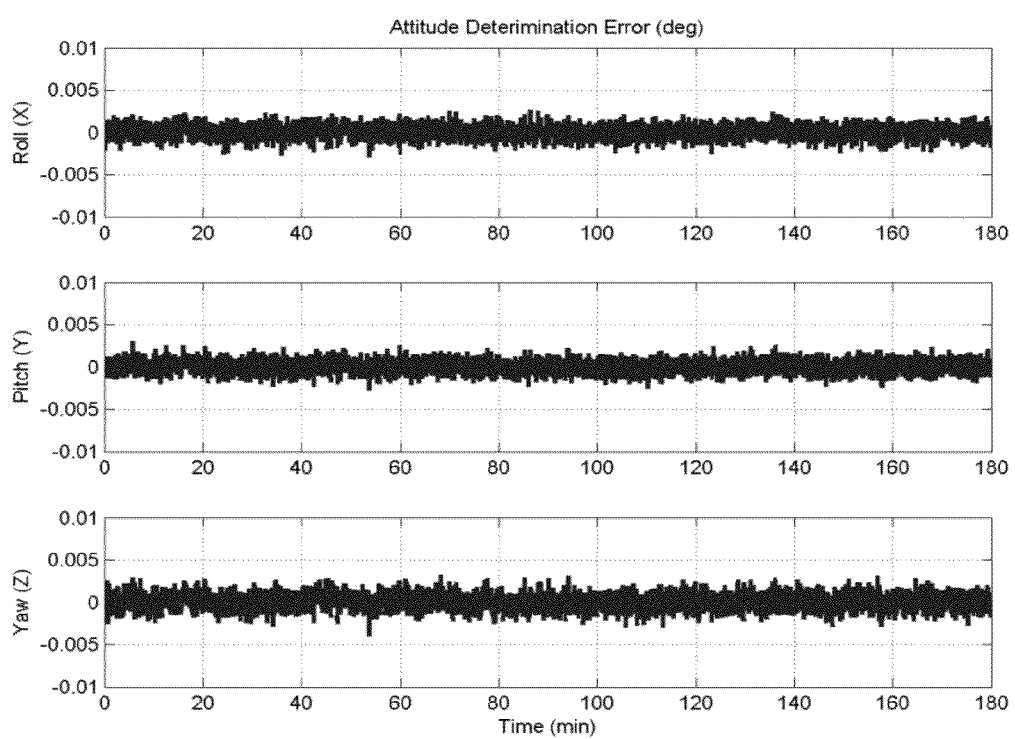
FIG. 9 is a plot showing improved attitude estimation error with 6 gyros and star tracker data according to an embodiment of the present invention.
Figure 10:
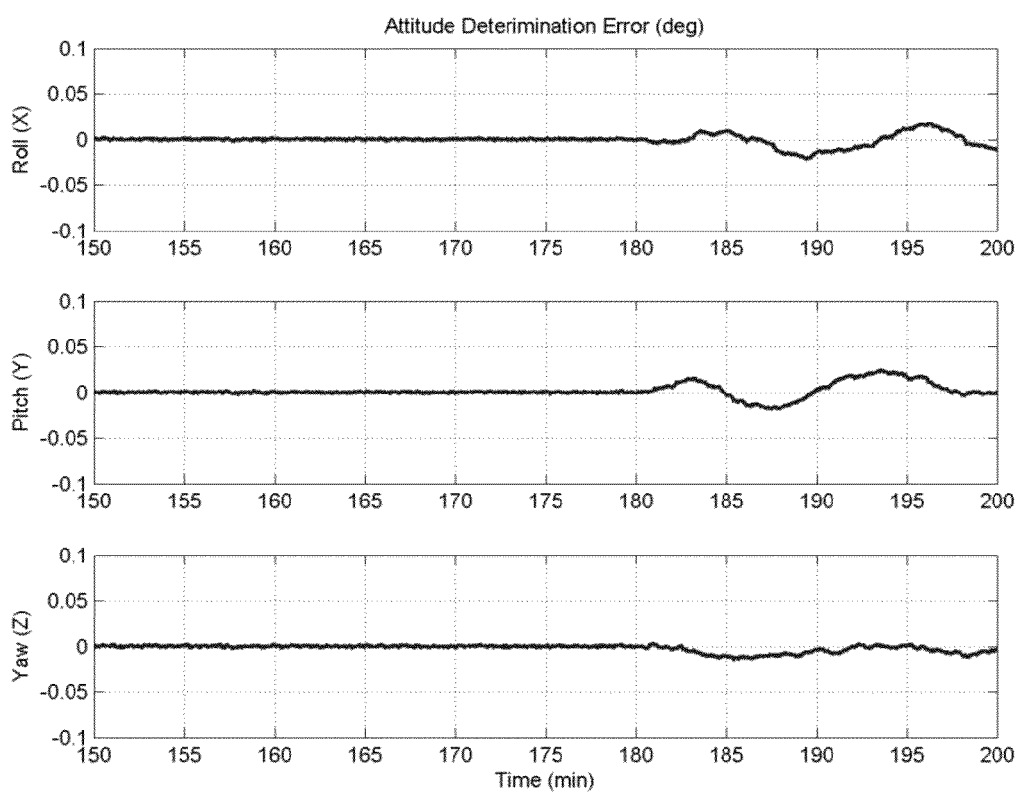
FIG. 10 is a plot showing improved attitude estimation error with 6 gyros and no star tracker data according to an embodiment of the present invention.

FIG. 7 shows the estimated gyro bias for the 6 gyro configuration and the common-mode transformation according to this embodiment of the invention. In this case, common-mode errors do not appear in the bias estimate since they are removed by the transformation from the gyro to body frame prior to the Kalman filter. In FIG. 8, the upper plot shows the modeled common-mode gyro bias error, and the lower plot shows the estimated common-mode gyro bias computed from Equation 7. As shown, this embodiment of the invention accurately separates the common-mode error. The improved attitude determination accuracy is shown in FIGS. 9 and 10. With star tracker data, there are no common-mode induced attitude errors as shown in FIG. 9. The invention significantly reduces the attitude errors without star tracker data as shown in FIG. 10. In this case, the maximum roll/pitch error is less than 0.03 deg and the yaw error is less than 0.01 deg.

Figure 11:
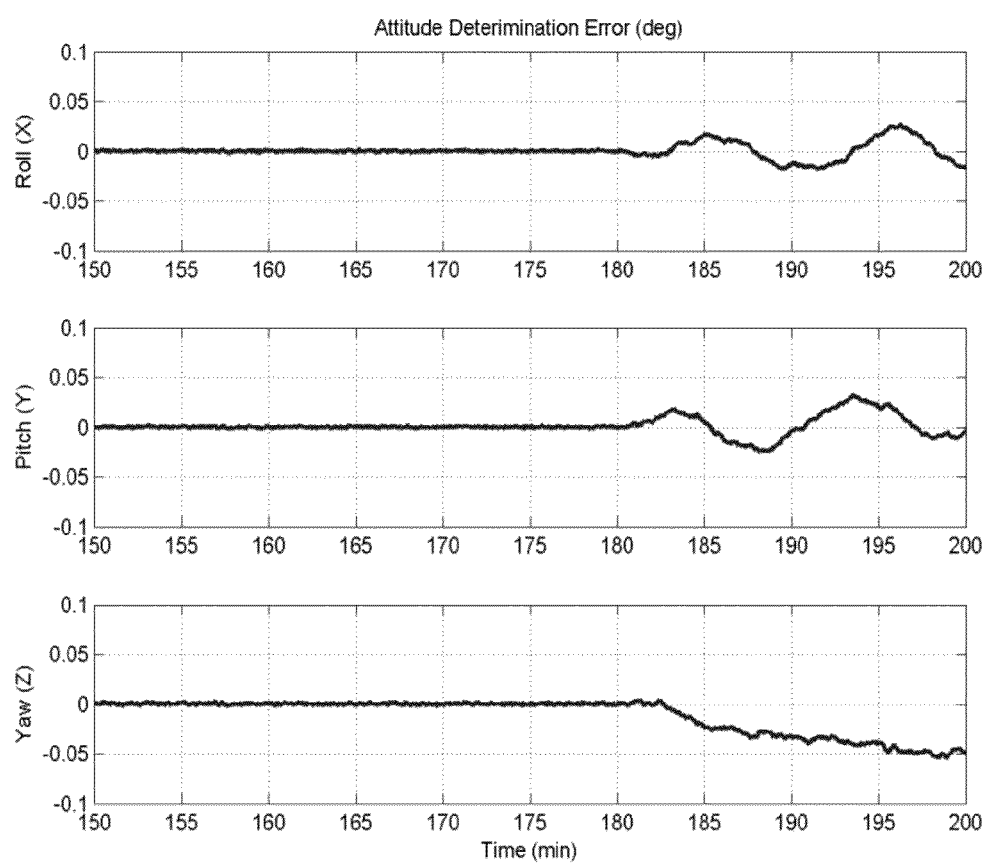
FIG. 11 is a plot showing attitude estimation error with 5 gyros and no star tracker data according to an embodiment of the present invention.
Figure 12:
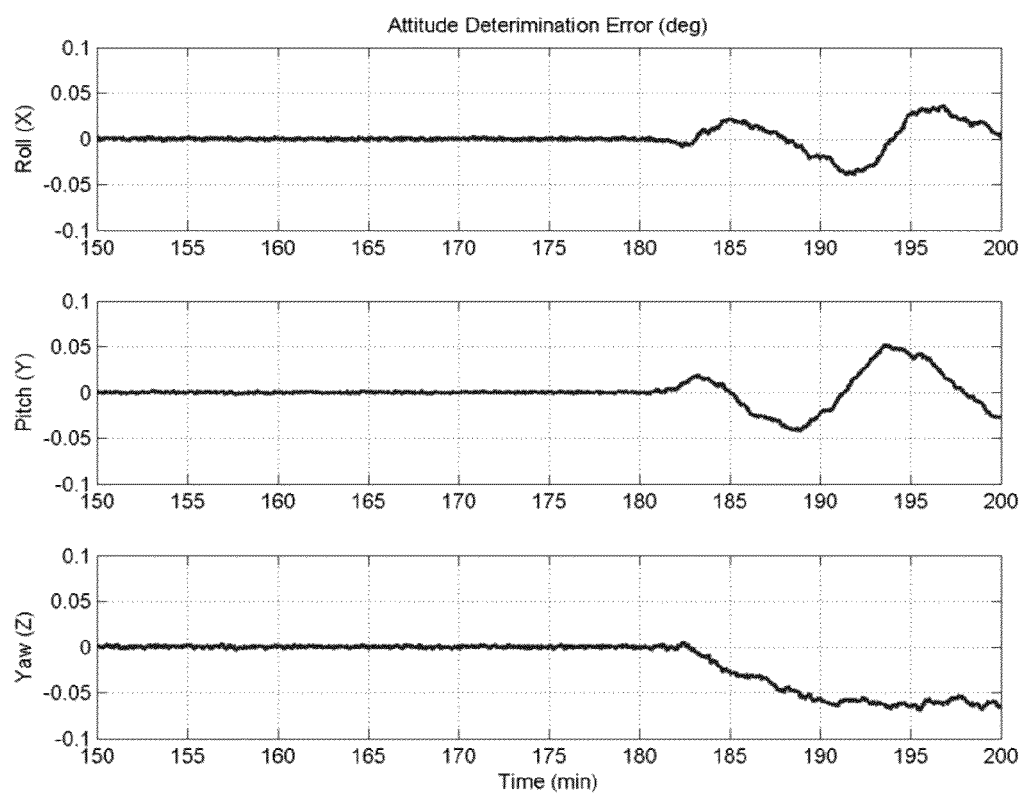
FIG. 12 is a plot showing attitude estimation error with 4 gyros and no star tracker data according to an embodiment of the present invention.

Another benefit of the invention is the ability to reject common-mode errors in the event of gyro failures. Removing any row from the W matrix in Equation 9 (i.e., no longer processing data from that failed gyro) results in a 5×4 matrix. The resulting W matrix still has a rank of 4, which satisfies the criteria of the invention and provides the ability to reject common-mode errors. This is confirmed by a simulation which assumes that the $6^{th}$ gyro in Equation 9 has failed. In this case, the first 5 rows of the W matrix are used to solve for the body rates in Equation 7. Accurate estimation accuracy during open-loop propagation using 5 gyros is confirmed in FIG. 11. In this case, the peak roll/pitch error remains less than 0.03 deg while the less critical yaw error reaches a peak value of 0.05 deg. The 6 gyro configuration above is also tolerant to some combinations of two gyro failures (as long as the resulting 4×4 W matrix has a rank of 4). This is illustrated by the attitude determination errors without tracker data shown in FIG. 12. In this case, the $5^{th}$ and $6^{th}$ gyros are removed from the processing. The resulting roll/pitch errors grow to 0.05 deg while the yaw error increases to 0.07 deg. The roll/pitch errors with 5 and 4 gyros are much smaller than the 0.6 deg error with the prior art system. The increased errors with fewer gyros are due to the higher contribution from uncorrelated noise as described below.

Unlike prior art systems, embodiments of the present invention use multiple gyros to estimate both the body rate and common-mode errors. As shown in Table 1 below, this results in higher amplification of the uncorrelated errors than prior art systems using the same number of gyros.

TABLE 1

| Noise Rejection Comparison | | | | |
| --- | --- | --- | --- | --- |
| Item | Prior Art | Present Invention | | |
| Number of gyros | 4 | 6 | 5 | 4 |
| Uncorrelated noise scaling | 0.9 | 0.7 | 1.0 | 1.2 |
| Common-mode error scaling | 1.7 | 0.0 | 0.0 | 0.0 |

Table 1 shows the worst-case contribution of uncorrelated errors along the three body axes. The prior art 4-gyro configuration described above attenuates uncorrelated errors by a factor of 0.9 compared to the above asymmetric 4 gyro configuration which amplifies these errors by 1.2. This can be overcome by using additional MEMS gyros as shown in Table 1. Unlike the prior art system, the 6, 5 and 4 gyro examples according embodiments of the present invention reject common-mode errors as shown by the last row in Table 1. For MEMS gyros systems that are susceptible to common-mode errors, the invention significantly improves AD accuracy despite the larger uncorrelated noise contribution as verified by the results in FIGS. 10 to 12.

The description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, 6th paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An attitude determination system, comprising:
a plurality of gyros configured to receive a supply voltage from a power supply; and
a processor configured to:
transform gyro rates from the gyros into body rates using a transformation, the transformation being based at least on a matrix computation that includes a gyro rate vector formed by the gyro rates from the gyros, wherein:
the processor is configured to utilize the transformation to determine the body rates and a respective common-mode error for each of the plurality of gyros based on the gyro rates from the gyros, wherein the attitude determination system is configured to allow each respective common-mode error to be induced at least in part by the power supply, and
during operation of the attitude determination system, the attitude determination system is configured to allow each respective common-mode error to be induced at least in part by the power supply, wherein the respective common-mode error of one gyro of the plurality of gyros is correlated with the respective common-mode error of each of the other gyros of the plurality of gyros;
correct the body rates for gyro biases; and
generate an attitude estimate based on the corrected body rates.

2. The attitude determination system of claim 1, wherein the processor is configured to output the respective common-mode error of one or more of the plurality of gyros.

3. The attitude determination system of claim 1, wherein the transformation is based on the following:

$$\begin{bmatrix} \omega_b(t) \\ e(t) \end{bmatrix} = M\omega_g(t)$$

where $\omega_b(t)$ is a body rate vector, $e(t)$ is an error value, $\omega_g(t)$ is the gyro rate vector, and M is an inverse or pseudo-inverse of a W matrix, wherein the W matrix is given by $$W = \begin{bmatrix} v_1(t) \\ v_2(t) \\ \vdots \\ v_N(t) \end{bmatrix} e$$

where c is a common-mode error weighting vector, $v_N(t)$ is a unit vector denoting an orientation of a respective gyro sensing axis in a spacecraft body frame, and N is the number of gyros.

4. The attitude determination system of claim 1, wherein the plurality of gyros comprise four or more gyros.

5. The attitude determination system of claim 1, wherein the processor is configured to estimate the gyro biases using a Kalman filter.

6. The attitude determination system of claim 1, wherein the processor is further configured to provide for transmission the attitude estimate to an attitude control system of a spacecraft.

7. The attitude determination system of claim 1, wherein the respective common-mode error of one gyro of the plurality of gyros is directly proportional to the respective common-mode error of each of the other gyros of the plurality of gyros.

8. The attitude determination system of claim 3, wherein the plurality of gyros are oriented such that the W matrix has a rank of four.

9. The attitude determination system of claim 3, wherein:
the common-mode error weighting vector comprises a respective weight value for each of the plurality of gyros, and
for each gyro of the plurality of gyros, the respective common-mode error of the gyro is based on the error value and the respective weight value of the gyro.

10. The attitude determination system of claim 5, further comprising an attitude sensor, wherein the processor is configured to generate another attitude estimate using the Kalman filter, attitude data from the attitude sensor and the attitude estimate.

11. A method for determining attitude, comprising:
transforming gyro rates from a plurality of gyros into body rates using a transformation, the transformation being based at least on a matrix computation that includes a gyro rate vector formed by the gyro rates, wherein:
based on the gyro rates from the plurality of gyros, the transformation is utilized to determine the body rates and a respective common-mode error for each of the plurality of gyros, and
each respective common-mode error is induced at least in part by a power supply configured to supply voltage to each of the plurality of gyros, wherein the respective common-mode error of one gyro of the plurality of gyros is correlated with the respective common-mode error of each of the other gyros of the plurality of gyros;
correcting the body rates for gyro biases; and
generating an attitude estimate based on the corrected body rates.

12. The method of claim 11, further comprising outputting the respective common-mode error of one or more of the plurality of gyros.

13. The method of claim 11, further comprising using the respective common-mode error of one or more of the plurality of gyros to monitor performance of the plurality of gyros.

14. The method of claim 11, wherein the transformation is based on the following:

$$\begin{bmatrix} \omega_b(t) \\ e(t) \end{bmatrix} = M\omega_g(t)$$

where $\omega_b(t)$ is a body rate vector, $e(t)$ is an error value, $\omega_g(t)$ is the gyro rate vector, and M is an inverse or pseudo-inverse of a W matrix, wherein the W matrix is given by $$W = \begin{bmatrix} v_1(t) \\ v_2(t) \\ \vdots \\ v_N(t) \end{bmatrix} e$$

where c is a common-mode error weighting vector, $v_N(t)$ is a unit vector denoting an orientation of a respective gyro sensing axis in a spacecraft body frame, and N is the number of gyros.

15. The method of claim 14, wherein the plurality of gyros are oriented such that the W matrix has a rank of four.

16. The method of claim 11, wherein the plurality of gyros comprise four or more gyros.

17. The method of claim 11, further comprising estimating the gyro bias using a Kalman filter.

18. The method of claim 11, further comprising providing for transmission the attitude estimate to an attitude control system of a spacecraft.

19. The method of claim 14, wherein:
the common-mode error weighting vector comprises a respective weight value for each of the plurality of gyros, and
for each gyro of the plurality of gyros, the respective common-mode error of the gyro is based on the error value and the respective weight value of the gyro.

20. The method of claim 17, further comprising generating another attitude estimate using the Kalman filter, attitude data from an attitude sensor and the attitude estimate.

* * * * *